INVENTOR.
GEORGE L. FALK
BY
Carl M. Lewis
ATTORNEY

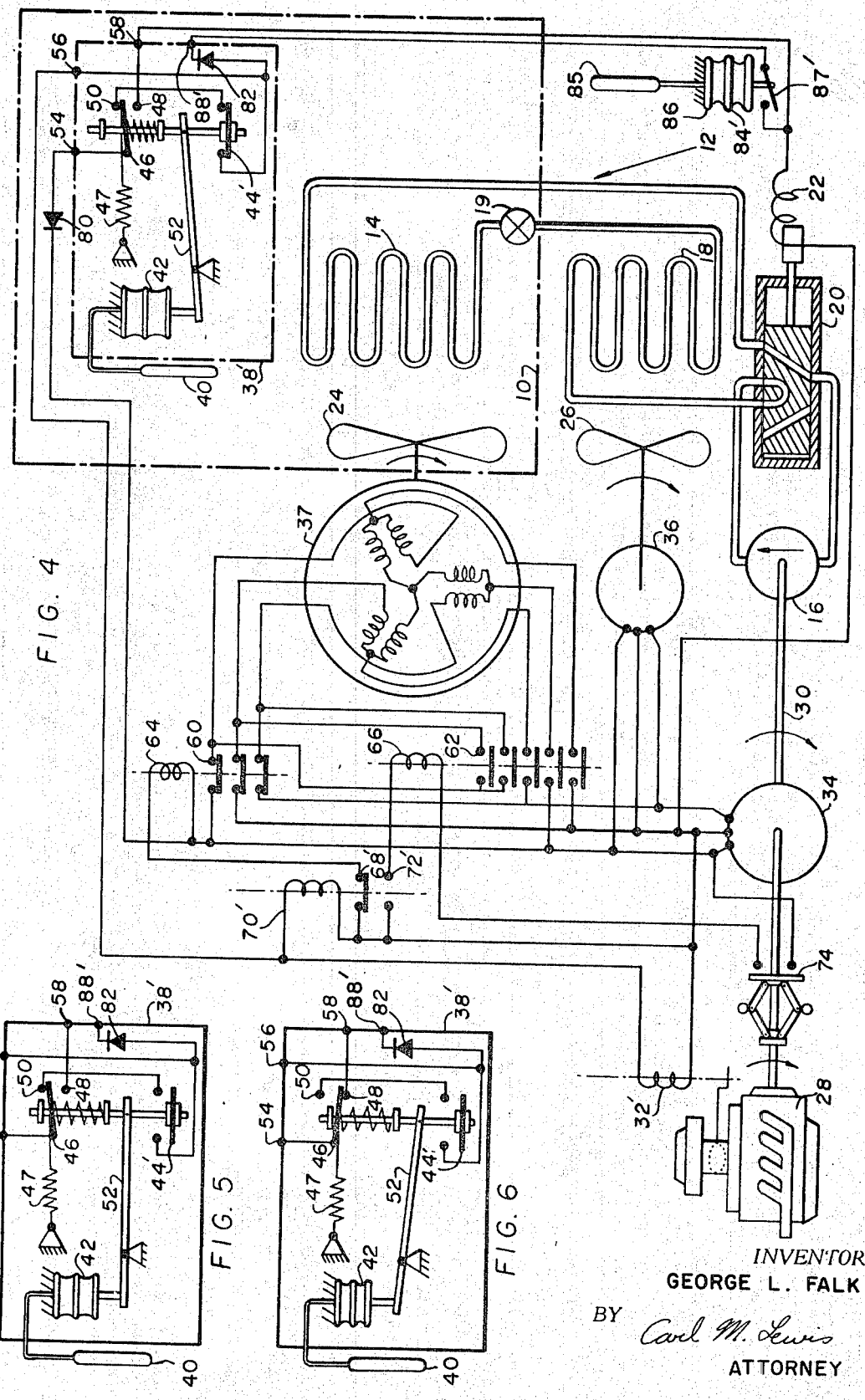

United States Patent Office 3,545,219
Patented Dec. 8, 1970

3,545,219
THERMOSTATIC CONTROL FOR REFRIGERATION SYSTEMS
George L. Falk, La Crosse, Wis., assignor to The Trane Company, La Crosse, Wis., a corporation of Wisconsin
Filed Nov. 15, 1968, Ser. No. 776,134
Int. Cl. F25b 13/00
U.S. Cl. 62—160
7 Claims

ABSTRACT OF THE DISCLOSURE

An engine driven air conditioning system for a transportation container having a first thermostat responsive to the container temperature for operating said system in the high speed cooling, low speed cooling, or heating modes, and a second thermostat responsive to outdoor temperature for controlling said heating mode between high and low speeds.

---

Figure 1:
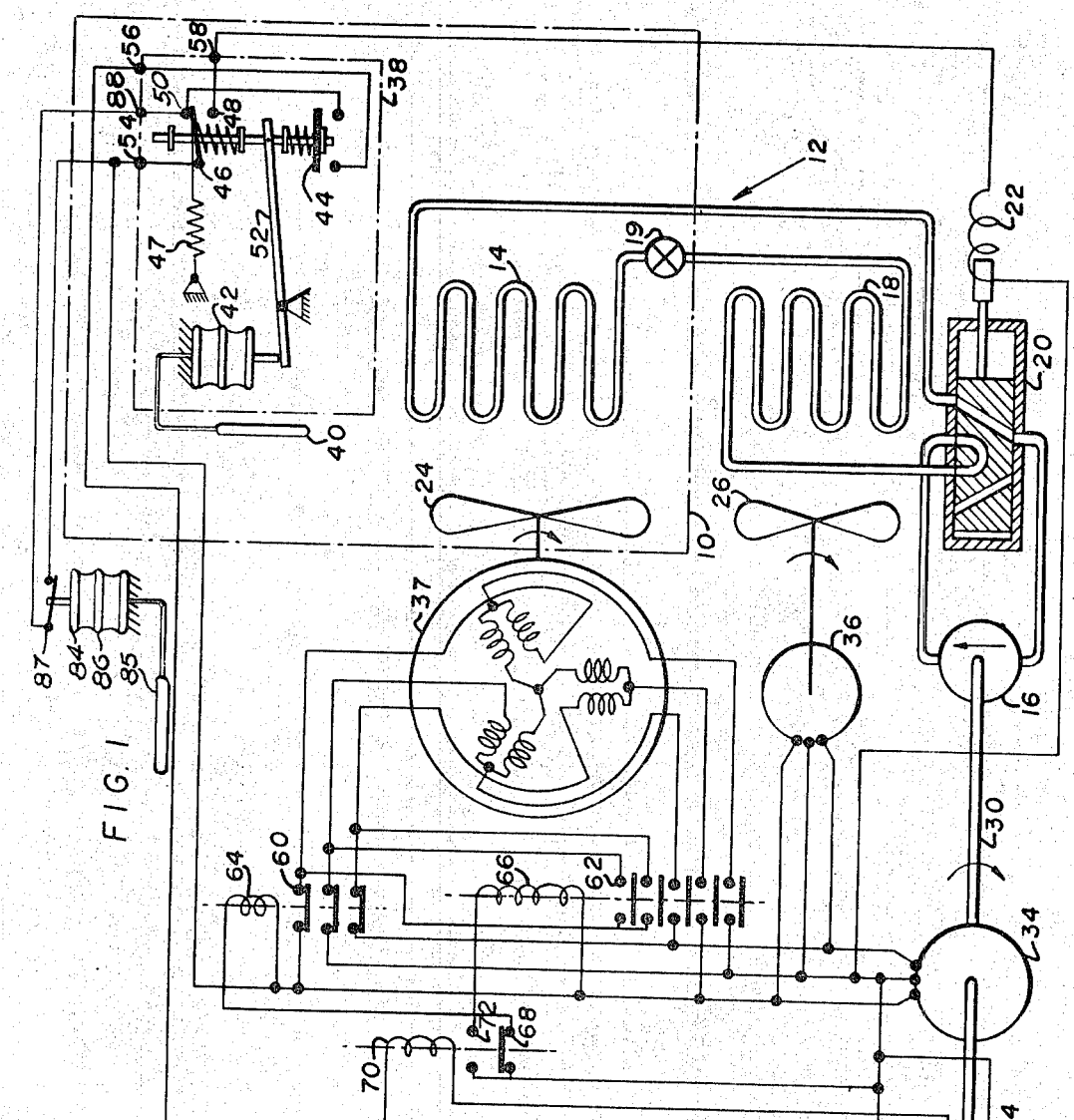

This invention relates to air conditioning systems and more specifically to control means therefor.

This invention has particular utility in transport air conditioning systems used in the transportation of goods which must be maintained at controlled temperatures such as frozen foods and produce. Such systems employ a refrigeration system having the usual refrigerant compressor, condenser, throttling means, and evaporator serially connected. Fans are generally employed to circulate air within the conditioned space and through heat exchanger which is arranged in fluid communication with the conditioned space.

Where heating is required, hot gas from the compressor may be delivered to the heat exchanger associated with the conditioned space.

Generally, a prime mover such as an internal combustion engine is employed to drive the compressor and fans. Of course, the thermal load on the air conditioning system will vary from time to time depending upon several factors including variations in ambient temperatures. It therefore is necessary to control the capacity of such conditioning systems during cooling and heating cycles.

One successful method of control has been to vary the speed of the prime mover. While it has not been found practical to continuously match the prime mover speed to the air conditioning load, it is practical to use a continuously running prime mover which is operated at several different speeds to obtain capacity control of the system. In addition to speed control, other forms of capacity control such as compressor cylinder unloading may be used if desired.

Thus, control cycles that provide high speed cooling, low speed cooling, low speed heating and high speed heating have been devised.

Unfortunately such control cycles require rather complex thermostatic mechanisms having at least three switches to be operated from a single thermal motor such as a bellows type actuator.

The present invention has for its object the provision of a control system for a transportation air conditioning system wherein a thermostat responsive to the temperature of the conditioned space selects the heating or cooling modes of operation and the speed of operation in the cooling mode and wherein a second thermostat responsive to ambient temperature selects the speed of operation in the heating mode.

Another object of this invention is to provide a control sequence wherein the system when operating at low speed cooling may move directly to high speed cooling, low speed heating, or high speed heating.

A further object of this invention is to provide a control circuit for a system having the control cycles set forth in the aforementioned objects wherein no thermostat control is required to have more than two switches.

Still a further object of my invention is to provide a control circuit for a multi-speed refrigeration system which employs a simple readily available two-stage thermostat and a readily available low cost single stage thermostat.

Yet another object of this invention is to provide four-mode operation to the refrigeration system disclosed in U.S. Patent 3,214,931 whereby greater fuel economy and longer life may be obtained by operating said system during the heating cycle at low speed.

Figure 2:
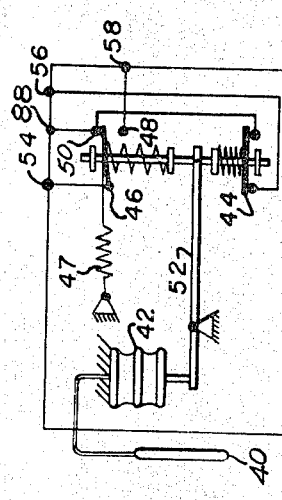
Figure 3:
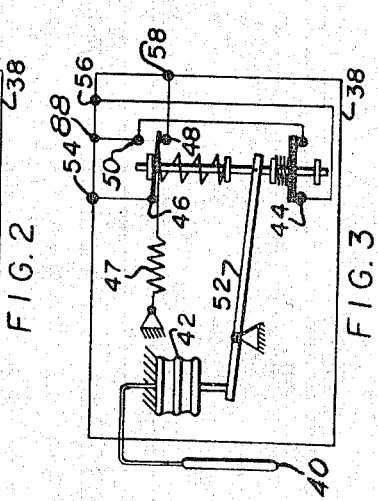

Other objects and advantages will become apparent as this specification proceeds to describe the invention with reference to the accompanying drawings in which like reference numerals designate like parts wherein:

FIG. 1 is a schematic diagram of the inventive refrigeration system shown in a high speed cooling cycle;
FIG. 2 shows the low speed cooling position of the thermostatic control of FIG. 1;
FIG. 3 shows the high speed heating position of the thermostatic control of FIG. 1;
FIG. 4 is a schematic diagram of a modified form of the inventive refrigeration control system shown in a high speed cooling cycle;
FIG. 5 shows the low speed cooling position of the thermostatic control of FIG. 4; and
FIG. 6 shows the high speed heating position of the thermostatic control of FIG. 4.

Now referring to FIG. 1 it will be seen that an air conditioned space 10, which may be the cargo space of a refrigerator car or refrigerator truck, is provided with a refrigeration system generally designated by numeral 12. The refrigeration system may be of the conventional reversible heat pump type which includes a first heat exchanger 14 arranged in fluid communication with the conditioned space 10 and preferably is located therein and normally functions as a refrigerant evaporator during the cooling cycle, a refrigerant compressor 16, a second heat exchanger 18 which may be located outside the conditioned space which normally functions as a refrigerant condenser during the cooling cycle, and a refrigerant throttling means 19 connected respectively in series forming a closed refrigerant circuit. Throttling means 19 may take the form of a capillary tube or a variable orifice expansion valve. The particular refrigeration system shown includes a refrigerant flow reversing valve 20 for reversing the direction of refrigerant flow in the first and second heat exchangers whereby the first heat exchanger 14 may be operated as a refrigerant condenser and the second heat exchanger 18 as a refrigerant evaporator. This system when operating in this reverse manner will hereinafter be referred to as the reverse flow heating cycle or more generically as the heating cycle. Valve 20 is actuated to the reverse flow heating cycle position by energization of cycle selector solenoid 22.

A fan means 24 is arranged to circulate air in the conditioned space and through heat exchanger 14. A second fan means 26 may also be arranged to circulate ambient air through heat exchanger 18.

Compressor 16 is driven by an internal combustion engine 28 via torque transmitting means 30. Engine 28 is arranged to operate at two distinct and separate speed ranges, a speed selector solenoid 32 being provided to shift the engine to low speed range when energized. The specifics of the speed control means are well known to those having ordinary skill in the art of engine speed control and do not per se constitute part of the present invention.

Engine 28 in addition to driving compressor 16 also drives a three phase alternating current generator 34. It is particularly desirable that the change in the generator output voltage due to change in speed be substantially proportional to the change in frequency resulting from changes of speed of the engine 28 within the normal speeds of operation. It is well within the scope of those having ordinary skill in the art of generator design to provide such generator characteristics. A motel YE–5294 Delco 230 volt three phase 60 cycle A.C. 1200 r.p.m. generator constructed by General Motors Corporation is suitable for this purpose. This generator may be operated at about 600 r.p.m. to produce 115 volt 30 cycle A.C. electric current. Generator 34 is arranged to drive electric motor 36 drivingly connected to fan means 26 and to drive a two speed variable torque reconnected single winding induction motor 37 drivingly connected to fan means 24.

The air conditioning system herein disclosed is provided with a control system which is responsive to temperature of the conditioned space as by thermostat 38 and of the outdoor ambient as by thermostat 84 which is schematically shown. Thermostats 38 and 84 function, as will be seen, to operate the engine speed selector solenoid 32 and the cycle selector solenoid 22 in response to temperatures of the conditioned space and outdoor ambient. Thermostat 38 includes a temperature sensing bulb 40 disposed in heat exchange relation with the conditioned space and in fluid communication with bellows actuator or thermal motor 42. Thermostat 38 also includes a first switch 44 and a second switch 46, the latter of which may be of the single-pole double-throw snap acting type having contacts 48 and 50. Bellows actuator 42 is operatively connected to switches 44 and 46 via appropriate connecting means 52. While thermostat 38 is shown schematically, it will be understood that switch 46 has but two positions and that transfer from one position to the other is accomplished substantially instantaneously in a snap action, such as for example via an over center spring 47. Type F43A remote bulb thermostat manufactured and sold by United Electric Controls is suitable for this purpose. Thermostat 38 receives electrical power at terminal 54 from generator 34 and delivers it to the speed selector solenoid 32 via terminal 56 and to the cycle selector solenoid 22 via terminal 58. Thermostat 84 includes a temperature sensing bulb 85 disposed in heat exchange relation with the outdoor ambient and in fluid communication with bellows actuator or thermomotor 86. Thermostat 84 also includes a switch 87. Bellows actuator 86 is operatively connected to move switch 87 by appropriate connecting means. Thermostat 84 is arranged to close switch 87 in response to an ambient temperature above a predetermined outdoor temperature and to open switch 87 in response to an ambient temperature below said predetermined outdoor temperature. The predetermined temperature must be one above which low speed heating will be adequate and somewhere below which high speed heating may be necessary. The predetermined temperature may be about 30° F. for many installations. However, this value will be different for systems of different capacity, etc.

Generator 34 is electrically connected to supply electric current to motors 36 and 37. Reference may be made to U.S. Patent 3,214,931 for the specific means including elements 60, 62, 64, 66, 68, 70, 72, 68', 70', 72', and 74 for energizing motor 37.

Prior to explaining the operation of the control system, it should be mentioned that cycle selector solenoid 22 and speed selector solenoid 32, draw their operating power from generator 34 and preferably from one phase thereof. It should be understood, however, that power for this control circuit may be derived from sources other than the generator such as a battery which may be used for starting engine 28.

The control system thus described functions to operate the air conditioning system in one of four cycles (high speed heating, low speed heating, low speed cooling and high speed cooling), the cycle of operation being selected by thermostat 38.

FIG. 1 shows thermostat 38 in the high speed cooling position, i.e., the conditioned space is excessively warm and sensing bulb 40 has expanded bellows 42 to its fully extended condition. Engine 28 is operating at high speed. Electrical power from one phase of generator 34 is delivered to terminal 54 of thermostat 38. While switch 46, which is connected to terminal 54, is in the position bridging contact 50, the circuit including speed selector solenoid 32 and contact 50 remains de-energized as switch 44 in series therewith remains open. Speed selector solenoid 32 which is not energized allows the engine 28 to operate at high speed. Since contact 48 of switch 46 is open, no power is delivered by way of terminal 58 to cycle selector solenoid 22 and the system remains in the cooling cycle. Compressor 16 operates at high speed and the refrigeration system thus functions at maximum cooling capacity.

As the temperature in the conditioned space falls below a first predetermined level, sensing bulb 40 and bellows actuator 42 move the thermostat switch 44 to the low speed cooling position as schematically illustrated in FIG. 2.

In the low speed cooling position speed selector solenoid 32 which is connected in series with terminal 56 of thermostat 38, is energized via a circuit including closed switch 44, switch 46 bridging contact 50, and thermostat terminal 54 connected to one phase of generator 34. Cycle selector 22 remains de-energized and in the cooling position.

Since speed selector solenoid 32 thus is energized, the speed of engine 28 is reduced to the low speed range. Compressor 16 is reduced to low speed for low capacity.

Should the system thus operating at low capacity cooling be inadequate to maintain the conditioned space at a sufficiently low temperature, the temperature in space 10 will rise above said first predetermined level and thermostat 38 will move back to its high speed operating position shown in FIG. 1, actuating engine 28 to high speed.

However, should the system be operating at low speed cooling with an outdoor temperature sufficiently low to open switch 87 and should the temperature in the conditioned space fall below a second predetermined level lower than said first predetermined, thermostat 38 will move into the position shown in FIG. 3 for high speed heating, opening the circuit including contact 50, switch 44, terminal 56, and speed selector solenoid 32, and closing the circuit including contact 48, terminal 58, and cycle selector solenoid 22. It is important to note that switch 46 breaks with terminal 50 initiating a change of speed immediately prior to the making of switch 46 with terminal 48 to initiate the heating cycle. De-energization of solenoid 32 actuates the engine 28 to high speed. Energization of cycle selector solenoid 22 places the system on the reverse flow heating cycle by actuating reversing valve 20. The system now operates at high speed heating.

Should, at any time during operation of this system on the heating cycle, the outdoor temperature be above the aforementioned predetermined outdoor temperature to close switch 87, a circuit is established including switch 87, terminal 88, switch 44, terminal 56, and speed selector solenoid 32 thereby energizing solenoid 32 for operating engine 28 at low speed for low speed heating. Thus, the system may pass directly into either high speed heating or low speed heating from low speed cooling dependent upon the outdoor temperature.

Should the temperature of the conditioned space become excessively high, the thermostat 38 will move into the low speed cooling position shown in FIG. 2 as previously described.

A modified form of control system is shown schematically in FIGS. 4–6. To the extent that the elements of this system are the same as those of the system shown in FIGS. 1–3, like reference numerals have been used to identify like parts. To the extent that such parts are only similar, like reference numerals with a prime have been employed.

The system of FIG. 4 utilizes a thermostat 38' which energizes the speed selector solenoid 32' for high speed operation. The action of speed selector solenoid 32' is the reverse of that of solenoid 32 of FIG. 1.

Thermostat 38' includes a modified switch 44' which is closed only when the thermostat is calling for high speed cooling. Thermostat 38' is arranged to operate on a source of unidirectional electric power such as for example a battery which may be used in starting the prime mover. For purposes of convenience of illustration, thermostat 38' has been connected to alternating current generator 34 but has been provided with a rectifier 80 in the supply circuit to terminal 54.

Thermostat 38' further includes a unidirectional conducting means 82 such as for example a diode for providing electrical connection between contact 48 and a point in the circuit extending between switch 44' and cycle selector solenoid 22.

The modified control system of FIGS. 4 through 6 also has an outdoor ambient temperature responsive thermostat 84' having a switch 87' operatively connected to bellows actuator 86 in fluid communication with sensing bulb 85 disposed to be responsive to outdoor ambient temperature for closing switch 87' in response to outdoor temperatures below a predetermined outdoor temperature, as for example, 30° F., and for opening switch 87' in response to outdoor temperatures above said predetermined outdoor temperature.

The modified control system as shown in FIG. 4 is in the high speed cooling position. It will be seen that in the position of the thermostat as shown, a circuit is completed which may be traced from the source of unidirectional current 80 to terminal 54, to contact 50 of switch 46, to switch 44', to terminal 56, to speed selector solenoid 32' which is thus energized. No electric current will flow between switch 44' and cycle selector solenoid 22 via unidirectional conducting means 82 as the polarity of the source as applied to means 82 is improper for conductance.

As the temperature in the conditioned space falls below a predetermined level, the thermostat 38' moves to the position shown in FIG. 5 for low speed cooling. The above mentioned circuit, energizing speed selector solenoid 32', is opened by switch 44' causing speed selector solenoid 32' to assume its low speed position. The circuit including cycle selector solenoid 22 remains de-energized, i.e. in the cooling position.

Should the temperature in the conditioned space fall below a second predetermined level lower than said first predetermined level, with an outdoor temperature sufficiently low to close switch 87', thermostat 38' will move to the position shown in FIG. 6 for high speed heating. In this position switch 46 bridges contact 48 and a circuit is established which may be traced between the source of unidirectional current 80, to contact 48 of switch 46, to terminal 58 to cycle selector solenoid 22 thus causing valve 20 to assume the heating cycle position. A second circuit is also established which may be traced between the source of unidirectional electric circuit 80, to contact 48 of switch 46, to terminal 58, to switch 87', to terminal 88', to unidirectional conductor 82, to terminal 56, to speed selector solenoid 32', thus causing engine 28 to operate at high speed.

Should, at any time during the operation of this modified system on the heating cycle, the outdoor ambient temperature be above the predetermined outdoor temperature to open switch 87', the circuit including switch 87' and speed selector solenoid 32' is interrupted, thereby operating engine 28 at low speed for low speed heating.

Thus it will be apparent that my novel control system provides four mode operation wherein the system when operating at low speed cooling may change directly to either high speed cooling, low speed heating or high speed heating. The circuit which is made part of my invention requires only simple thermally operated switches thus requiring a minimum of cost, adjustment, and maintenance. A simple and readily available two stage thermostat may employed at the heart of the control system while a second single stage thermostat responsive to outdoor ambient is employed to change the speed on the heating cycle.

Having thus described in detail two of the preferred embodiments of my invention, I contemplate that many changes may be made without departing from the scope or spirit of the invention and I desire to be limited only by the claims.

I claim:

1. An air conditioning system for conditioning a space, comprising: a closed refrigerant circuit including; a refrigerant compressor, a refrigerant condenser, a refrigerant throttling means, and a refrigerant evaporator connected respectively in series; a prime mover operable in a first speed range and a second speed range higher than said first speed range and drivingly connected to said compressor; means for operating said refrigerant circuit on a first heating cycle to heat said conditioned space and on a second cooling cycle to cool said conditioned space; first selector means for selecting one of said first and second cycles of operation; second selector means for selecting one of said two speed ranges of operation of said prime mover; a first thermostatic control means responsive to the temperature of said conditioned space for actuating said first and second selector means and a second thermostatic control means responsive to ambient temperature outside said conditioned space for actuating said second selector means.

2. The apparatus as defined by claim 1 wherein said first thermostatic control means overrides said second thermostatic control means on the cooling cycle.

3. The apparatus as defined by claim 1 wherein said second thermostatic control means overrides said first thermostatic control means for actuating said second selector means on the heating cycle.

4. An air conditioning system for conditioning a space, comprising: a closed refrigerant circuit including; a refrigerant compressor, a refrigerant condenser, a refrigerant throttling means, and a refrigerant evaporator connected respectively in series; a prime mover operable in two distinct and separate speed ranges drivingly connected to said compressor; a two position electromagnetic speed control means for selecting the speed range for said prime mover; means for operating the refrigerant circuit on a first heating cycle to heat said conditioned space and on a second cooling cycle to cool said conditioned space; a two position electromagnetic cycle selector means for selecting the cycle of operation of said refrigerant circuit; first thermostatic control means responsive to the temperature at said conditioned space for controlling the positions of said two position electromagnetic speed control means and said two position electromagnetic cycle selector means; and second thermostatic control means responsive to the ambient temperature external to said conditioned space for controlling the positions of said two position electromagnetic speed control means.

5. The apparatus as defined by claim 4 wherein said first thermostatic control means overrides said second thermostatic control means on the cooling cycle.

6. The apparatus as defined by claim 4 wherein said second thermostatic control means overrides said first thermostatic control means for actuating said two position electromagnetic speed control means for selecting the speed range of said prime mover on the heating cycle.

7. An air conditioning system for conditioning a space, comprising: a closed refrigerant circuit including; a refrigerant compressor, a refrigerant condenser, a refrigerant throttling means, and a refrigerant evaporator connected respectively in series; a prime mover operable in a first speed range and a second speed range higher than said first speed range and drivingly connected to said compressor; means for operating said refrigerant circuit on a first heating cycle to heat said conditioned space and on a second cooling cycle to cool said conditioned space; first selector means for selecting one of said first and second cycles of operation; second selector means for selecting one of said first and second speed ranges of operation of said prime mover; a first thermostatic control means responsive to the temperature of said conditioned space for actuating said first selector means to a first heating cycle position in response to a conditioned space temperature below a first predetermined value and to a second cooling cycle position in response to a conditioned space temperature above about said first predetermined value and for actuating said second selector means to said first speed range in response to a conditioned space temperature above said first predetermined value and below a second predetermined value higher than said first predetermined value and to said second speed range in response to a conditioned space temperature above about said second predetermined value; and second thermostatic control means responsive to the ambient temperature outside said conditioned space for actuating said second selector means to said second speed range in response to ambient temperature below a third predetermined value and to said first speed range in response to an ambient temperature above about said third predetermined value when said first selector means is positioned for said first heating cycle.

References Cited
UNITED STATES PATENTS 2,887,853    5/1959    Talmey _____ 62—323

WILLIAM J. WYE, Primary Examiner

U.S. Cl. X.R.

62—180, 208, 323